Jan. 20, 1931. M. W. GELETTE 1,789,740
AUTOMOBILE REGISTRATION PLATE HOLDER
Filed May 9, 1930
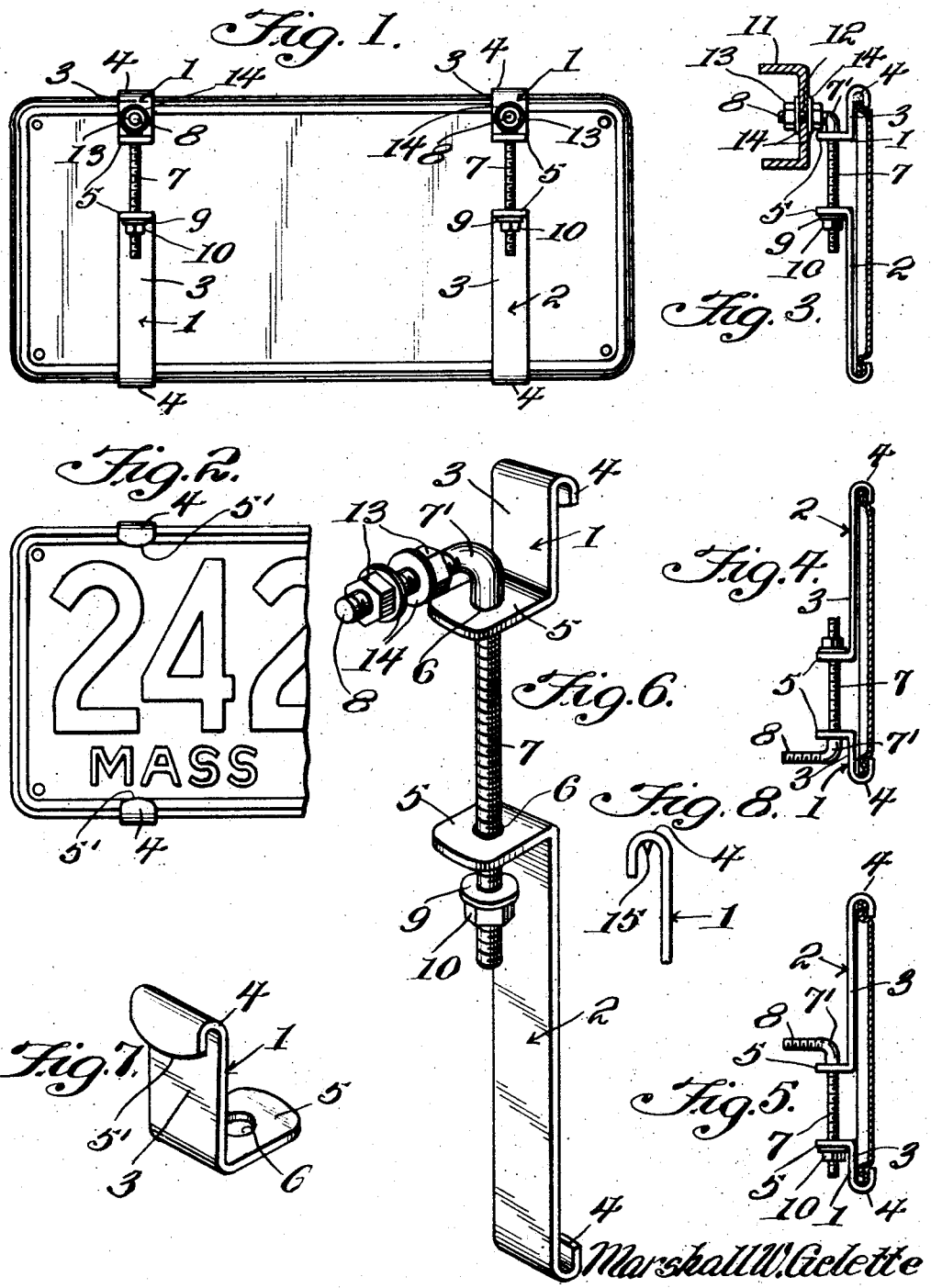

Patented Jan. 20, 1931

1,789,740

UNITED STATES PATENT OFFICE

MARSHALL W. GELETTE, OF NEW BEDFORD, MASSACHUSETTS

AUTOMOBILE REGISTRATION-PLATE HOLDER

Application filed May 9, 1930. Serial No. 451,119.

This invention relates to improvements in brackets for supporting automobile license plates and has as its primary object to provide a device of this class so constructed that it may be readily mounted upon any appropriate fixed part of the automobile and without the necessity or likelihood of in any way mutilating the license plate.

Another object of the invention is to provide a bracket for the purpose stated, so constructed that it may be employed in supporting license plates of various marginal dimensions.

Another object of the invention is to provide a license plate bracket which may be attached to the plate at any point in the length thereof so that two of the brackets which are employed for supporting a license plate may be symmetrically arranged, or arranged in a most convenient manner without regard to the location of any bolt openings or slots which may be present in the plate.

Another object of the invention is to provide a bracket for supporting an automobile license plate, which bracket will consist of plate clamping and attaching means, the component parts of which may be variously arranged with respect to one another and likewise with respect to the license plate, so that the said parts may be arranged in a manner to provide for a most convenient arrangement thereof with respect to the plate and to the part of the automobile upon which the plate is to be mounted.

Another object of the invention is to provide a license plate bracket so constructed that in the removal of a license plate therefrom and the substitution of another plate, it will be wholly unnecessary to dismount the fixed part from the automobile upon which it is attached.

This invention also consists in certain other features of construction and in the combination and arrangement of the several parts, to be hereinafter fully described, illustrated in the accompanying drawing, and specifically pointed out in the appended claims, it being understood of course that minor changes may be made so long as they fall within the scope of the claims.

In describing my invention in detail, reference will be had to the accompanying drawing, wherein like characters denote like or corresponding parts throughout the several views, and in which:—

Figure 1 is a view in rear elevation of a pair of the brackets embodying the invention applied to a license plate to be supported thereby.

Figure 2 is a fragmentary front elevation of the license plate and illustrating so much of the bracket as will be visible to one viewing the plate.

Figure 3 is a view partly in section and partly in elevation illustrating the manner in which the bracket is connected with the plate to be supported and with a fixed part of the automobile, the view illustrating one arrangement of the component parts of the bracket.

Figure 4 is a similar view illustrating another relative arrangement of the component parts of the bracket.

Figure 5 is a similar view illustrating still another arrangement of the component parts of the bracket.

Figure 6 is a perspective view, in detail, of one of the brackets.

Figure 7 is a perspective view illustrating one of the license plate connecting members of the bracket.

Figure 8 is a fragmentary view in side elevation illustrating a portion of one of the members of the bracket.

The bracket embodying the invention comprises two license plate clamping members, one of which is indicated in general by the numeral 1 and the other by the numeral 2, and each of these members is formed from a one piece strip of metal and each includes a shank 3 the upper edge portion of which is overturned as indicated by the numeral 4 and rounded at its lower margin as indicated by the numeral 5', and this overturned marginal portion is therefore adapted to engage either over the upper edge of the license plate to be mounted or the lower edge of said plate, depending upon the disposition of the bracket with respect to the license plate.

Each member further comprises a right angularly extending ear 5 and the ear of each member is formed with an opening 6. The numeral 7 indicates a threaded stem which is fitted through the opening 6 and this stem, near its upper end, is formed with a bend 7' providing a right angularly extending attaching portion 8 which is threaded as most clearly shown in Figure 6 of the drawing. In order that the two bracket members may be relatively adjustably connected by the stem 7, a washer 9 is fitted to the lower portion of the stem as shown in Figure 6 and a nut 10 is threaded onto this portion of the stem and is adjustable to cause the washer 9 to bear against the under side of the ear 5 of the section 2 when the sections are arranged in the manner shown in Figures 1, 3 and 6 of the drawing, or against the inner side of the ear 5 of the section 1 when the sections are arranged as shown in Figure 4, it being understood at this point that the bend 7' will bear against the inner side of the other ear 5 of the other bracket member when the nut 10 is tightened.

By reference to the drawing it will be observed that the bracket member 1 is of considerably less length than the member 2 and that either of the members may be arranged uppermost in assembling the bracket with the license plate to be supported. The device is adaptable for attachment to any fixed part of the automobile and in Figure 3 there is illustrated a channel iron bar 11 which constitutes a part of the chassis frame of the automobile, and this bar is formed with an opening 12 through which the threaded stem extension 8 is fitted, and nuts 13 and washers 14 are threaded onto this portion of each stem and tightened to bear against the inner and outer sides of the web of the said channel iron 11.

It will be understood from the foregoing description that the brackets may be slidably adjusted longitudinally of the license plate to which they are applied so as to be spaced apart any desired distance or spaced, from the ends of the plate, any desired distance so that if the member 11 is, for example, provided with bolt openings, spaced apart a certain distance, the bracket members may, under this condition be so adjusted with respect to the license plate as to adapt the threaded extension 8 of their stems to fit through the openings, without the necessity of drilling other openings. It will likewise be evident by a comparison of Figures 3, 4 and 5, that the bracket members 1 and 2 may be, respectively, applied to the upper and lower edges of the license plate as shown in Figure 3 or reversely applied as shown in Figures 4 and 5 and, in the latter instance, the threaded stem extensions 8 may be located below the lower one of the bracket members or in other words, the member 1 as shown in Figure 4 of the drawing, or above the ear 5 of the bracket member 2 as shown in Figure 5 of the drawing. Therefore the attaching stem extension 8 may be positioned opposite the upper portion of the license plate or the lower portion thereof, or the mid-portion of the plate, and therefore the plate may be properly mounted to avoid obstructions which might prevent its application, without considerable trouble, if it were not for the difference in length of the members 1 and 2 and the interchangeability of the stem 7 and its extension 8 with respect to the said bracket members.

Ordinarily by tightening the nut 10, each bracket may be sufficiently securely held in engagement with the upper and lower margins of the license plate to preclude any likelihood of longitudinal displacement of the bracket with respect to the plate, but, if desired, the overturned portion 4 of each bracket member may be formed in its inner side and centrally, with a spur as shown in Figure 8 and indicated by the numeral 15 and which spur will bite into the respective margin of the license plate when the nut 10 is tightened.

What I claim is:—

1. A bracket for supporting an automobile license plate comprising a pair of plate holding members, of different lengths, each having a terminal portion to engage one or two opposite edges of the plate to be held, and means adjustably connecting the members and including an element for connection with a fixed part of the automobile, the said means comprising a threaded stem fitted through openings in ears upon the said plate holding members, and a nut threaded upon the stem to engage one of said ears, and the element for connection with a fixed part of the automobile comprising a right angular extension of one end of the said stem, said extension being threaded and nuts being fitted thereto.

2. A bracket for supporting an automobile license plate comprising a pair of plate holding members, of different lengths, each having an overturned terminal portion to engage one of two opposite edges of the plate to be held, means adjustably connecting the members and including an element for connection with a fixed part of the automobile, and a spur upon the inner side of the overturned terminal portion to engage in the edge of the license plate with which the overturned terminal portion is engaged.

In testimony whereof I affix my signature.

MARSHALL W. GELETTE.